US007898412B2

(12) United States Patent
Riley et al.

(10) Patent No.: US 7,898,412 B2
(45) Date of Patent: Mar. 1, 2011

(54) SECURITY SYSTEM INCLUDING GENETIC SAMPLING DEVICE

(75) Inventors: James W Riley, Rochester, NY (US); Steve Markham, Rochester, NY (US)

(73) Assignees: Bosch Security Systems, Inc., Broadview, IL (US); Robert Bosch GmbH, Stuttgart (DE)

( * ) Notice: Subject to any disclaimer, the term of this patent is extended or adjusted under 35 U.S.C. 154(b) by 395 days.

(21) Appl. No.: 12/246,860

(22) Filed: Oct. 7, 2008

(65) Prior Publication Data

US 2010/0085187 A1 Apr. 8, 2010

(51) Int. Cl.

| | |
|---|---|
| ***G08B 13/00*** | (2006.01) |
| ***G08B 13/08*** | (2006.01) |
| ***G08B 29/00*** | (2006.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl. .................. 340/541; 340/545.2; 340/5.81; 340/5.82

(58) Field of Classification Search ................ 340/541, 340/545.2, 565, 5.3, 5.31, 5.8, 5.81, 5.82; 235/382, 382.5; 43/59
See application file for complete search history.

(56) References Cited

U.S. PATENT DOCUMENTS

| | | | | |
|---|---|---|---|---|
| 6,786,401 | B2 | 9/2004 | Kimoto et al. | |
| 6,927,671 | B2 | 8/2005 | DeBono | |
| 6,985,070 | B1 | 1/2006 | Parker | |
| 2004/0075563 | A1 | 4/2004 | Hanabusa et al. | |
| 2004/0080411 | A1 | 4/2004 | Renfro | |
| 2004/0164866 | A1 | 8/2004 | Hanabusa et al. | |
| 2005/0206502 | A1 | 9/2005 | Bernitz | |
| 2005/0212657 | A1* | 9/2005 | Simon | 340/5.74 |
| 2007/0030115 | A1 | 2/2007 | Itsuji et al. | |
| 2007/0207549 | A1* | 9/2007 | Sangha et al. | 436/63 |
| 2008/0020163 | A1* | 1/2008 | Calcagno | 428/40.1 |
| 2008/0056943 | A1* | 3/2008 | Sherwood | 422/63 |
| 2009/0278659 | A1* | 11/2009 | Castellanos et al. | 340/5.82 |

* cited by examiner

*Primary Examiner*—Jennifer Mehmood
(74) *Attorney, Agent, or Firm*—Keith J. Swedo, Esq.; Taft, Stettinius & Hollister, LLP

(57) ABSTRACT

A security system includes a sensor for sensing a presence of an intruder within a protected space. A genetic sample-gathering mechanism takes a genetic sample from the intruder in response to a signal from the sensor.

20 Claims, 2 Drawing Sheets

SECURITY SYSTEM INCLUDING GENETIC SAMPLING DEVICE

BACKGROUND

1. Field of the Invention

The present invention relates to security systems, and, more particularly, to security systems for protecting a residence, commercial property or equivalent.

2. Description of the Related Art

The traditional method used by authorities to obtain a genetic sample is by searching the crime scene. The area to be searched is typically on the order of thousands of square feet. Because genetic samples may be as small as a human skin cell or a single strand of hair, it is difficult and may be impossible to locate a sample over such a large area.

Known security systems may sense the presence of an intruder within protected premises, but do so passively. That is, even after detecting an invasion, known security systems do not take advantage of the opportunity to gather physical evidence of the identity of the intruder.

What is neither disclosed nor suggested by the art is a security system that samples genetic material from an intruder in the event that the system senses a breach in security of a building or premises.

SUMMARY OF THE INVENTION

The present invention provides a security system used to protect a residence, commercial property or equivalent. With respect to crime scene analysis, the invention provides authorities with genetic samples of intruders such that the DNA can be used to identify the perpetrators. The security system may be outfitted with a mechanism used to obtain a genetic sample. This mechanism is placed at all standard points of entry and exit, such as at front and back doors. The genetic sample-gathering mechanism may be in the form of a vacuum pump, turnstile, or static charge, for example. The genetic sample-gathering mechanism may be activated as a result of the security system being compromised. When the security system is active or armed, the genetic sample-gathering mechanism may capture, store and timestamp a genetic sample when the intruder passes through the mechanism.

The invention comprises, in one form thereof, a security system including a sensor for sensing a presence of an intruder within a protected space. A genetic sample-gathering mechanism takes a genetic sample from the intruder in response to a signal from the sensor.

The invention comprises, in another form thereof, a method of operating a security system, including providing a sensor in the security system. The sensor is used to sense a presence of an intruder within a protected space. A genetic sample-gathering mechanism is provided in the security system. A signal is transmitted from the sensor to the genetic sample-gathering mechanism in response to the sensing of the intruder. The genetic sample-gathering mechanism is used to take a genetic sample from the intruder in response to the signal from the sensor.

The invention comprises, in yet another form thereof, a method of operating a security system, including providing a sensor in the security system. The sensor is used to sense a presence of an intruder within a protected space. A genetic sample-gathering mechanism is provided in the security system. A signal is transmitted from the sensor to the genetic sample-gathering mechanism in response to the sensing of the intruder. The genetic sample-gathering mechanism is used to take a genetic sample from the intruder in response to the signal from the sensor. The genetic sample is stored in a container. A date and time of day associated with the taking of the genetic sample is recorded.

An advantage of the present invention is that a genetic sample may be taken from an intruder at the moment when he is detected and his whereabouts are known.

Another advantage is that a genetic sample may be taken from the intruder without him being aware that the sample was taken.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
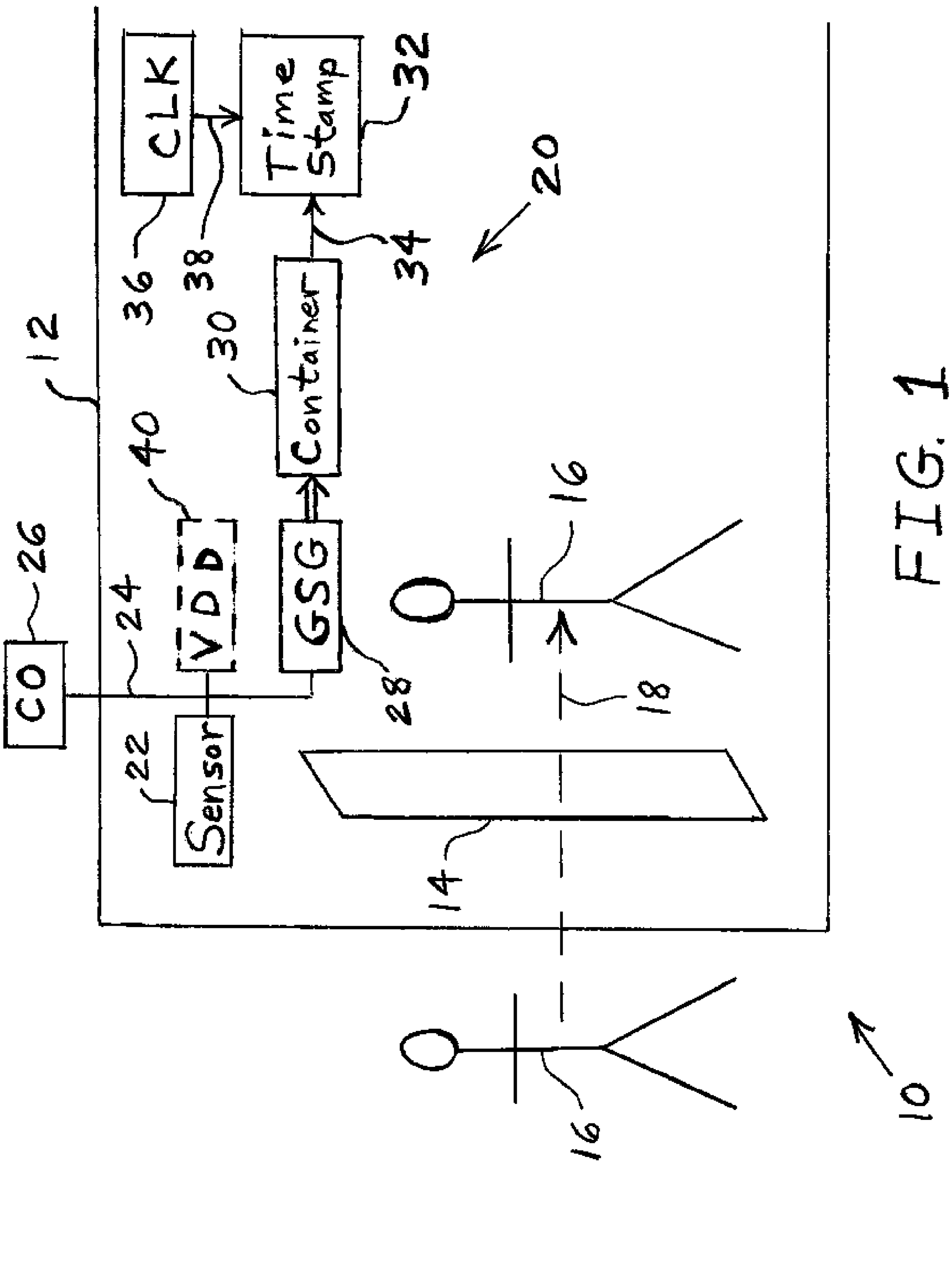
FIG. 1 is a block diagram of one embodiment of a security system of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIG. 1, there is shown one embodiment of a security system 10 of the present invention. Security system 10 includes protected premises 12, such as a residence, building, or other defined space. Premises 12 include one or more points of ingress 14 through which it is possible that an intruder 16 may enter premises 12, as indicated by arrow 18. Each of points of ingress 14 may be in the form of a doorway or window, for example.

Security system 10 also includes an electronic monitoring arrangement 20 including a security sensor 22 which may sense the presence of intruder 16 within premises 12 and/or the passing of intruder 16 through point of ingress 14. For example, security sensor 22 may be in the form of a motion detector, heat detector, door switch or window switch. Upon sensing the presence of intruder 16, sensor 22 may emit an electronic signal, such as an alarm signal, on line 24 to a central office 26. Central office 26 may then notify police or other authorities that intruder 16 has entered premises 12 such that the police may attempt to apprehend intruder 16.

Arrangement 20 also includes a genetic sample-gathering mechanism 28 that may extract and collect a DNA sample, such as a hair, saliva or skin sample, from intruder 16. More particularly, mechanism 28 may receive the signal from sensor 22 on line 24 upon sensor 22 sensing the presence of intruder 16. Genetic sample-gathering mechanism 28 may be in the form of any mechanism that is capable of obtaining a genetic sample from intruder 16 upon receiving the signal from sensor 22. However, in particular embodiments of the present invention, mechanism 28 is in the form of a vacuum pump, a turnstile, and a static charge attraction device, respectively.

A vacuum pump type of mechanism 28 may be installed in a ceiling of premises 12 at a location about one to ten feet from point of egress 14. Upon receiving the signal from sensor 22, a motor in the vacuum pump may be started to thereby create a suction or air flow from the general area surrounding intruder 16, i.e., below the vacuum pump, towards the vacuum pump. Thus, samples of the DNA of intruder 16, such as hairs, cells of dead skin, and/or saliva, may be sucked away from intruder 16 and into the vacuum pump. The vacuum pump may include, or be associated with, a container 30 such as a conventional vacuum bag for collecting and storing the DNA sample collected from intruder 16.

A turnstile type of mechanism 28 may be installed inside premises 12 such that intruder 16 cannot gain access to any person or thing of significant value within premises 12 without first passing through the turnstile. In one particular embodiment, the turnstile includes about four horizontally-oriented arms extending radially from a central hub about which each of the arms may be rotated in a horizontal plane. Upon receiving the signal from sensor 22, an actuator within the turnstile may uncover adhesive surfaces on the arms of the turnstile. When intruder 16 engages and rotates one or more of the arms, DNA samples from intruder may be adhered to the adhesive surface(s). Upon sensing that the rotation of the arms has ceased, the actuator may then return the surfaces of the arms to their former covered state. Thus, the DNA samples may be collected and stored within the arms of the turnstile, and it is the housing or shell of the arms that functions as container 30 in this embodiment.

A static charge attraction device type of mechanism 28 may be installed on a ceiling, wall or floor of premises 12 such that intruder 16 may pass close enough to the attraction device that DNA samples on intruder 16 may be electrostatically removed from intruder 16 and physically transferred to the attraction device. For instance, upon receiving the signal from sensor 22, a surface of the attraction device may be provided with a negative charge via conventional methods. Positively charged DNA samples on intruder 16 may then be transferred to and electrostatically adhered to the attraction device. After a predetermined time period, or when sensor 22 no longer senses the presence of intruder 16 in the immediate vicinity, the negative charge may be removed from the attraction device. The removal of the negative charge on the attraction device may cause the collected DNA samples to no longer be adhered to the attraction device and may allow the DNA samples to fall into, or be scraped into a container 30.

Regardless of the form of genetic sample-gathering mechanism 28 or of container 30, a time stamp module 32 may record the date and time of day that the DNA sample stored in container 30 is collected. Container 30 may sense the presence of a DNA sample and may consequently send a signal 34 to module 32 indicating that a DNA sample has been collected. Module 32 may also receive continuous date and time of day updates from a clock 36, as indicated at 38. Thus, whenever module 32 receives a signal 34 indicating that a DNA sample has been collected, module is able to record the current date and time of day associated with the collection of the DNA sample.

In another embodiment, module 32 receives the signal from sensor 22 and interprets that signal as indicating that a DNA sample has been, or soon will be, collected in container 30. Thus, in this embodiment, signal 34 is eliminated.

It may be desirable for the DNA sample to be collected without intruder 16 knowing that the DNA sampling has occurred. Thus, an optional visual distraction device 40 may be provided in order to create a visual distraction that may prevent intruder 16 from noticing any motion or noise that may be associated with operation of genetic sample-gathering mechanism 28. For example, upon receiving the signal from sensor 22, distraction device 40 may provide a flash of light that temporarily blinds intruder 16. In another embodiment, distraction device 40 may instead, or additionally, provide an audio distraction such as audio static and/or a loud and intense noise.

Figure 2:
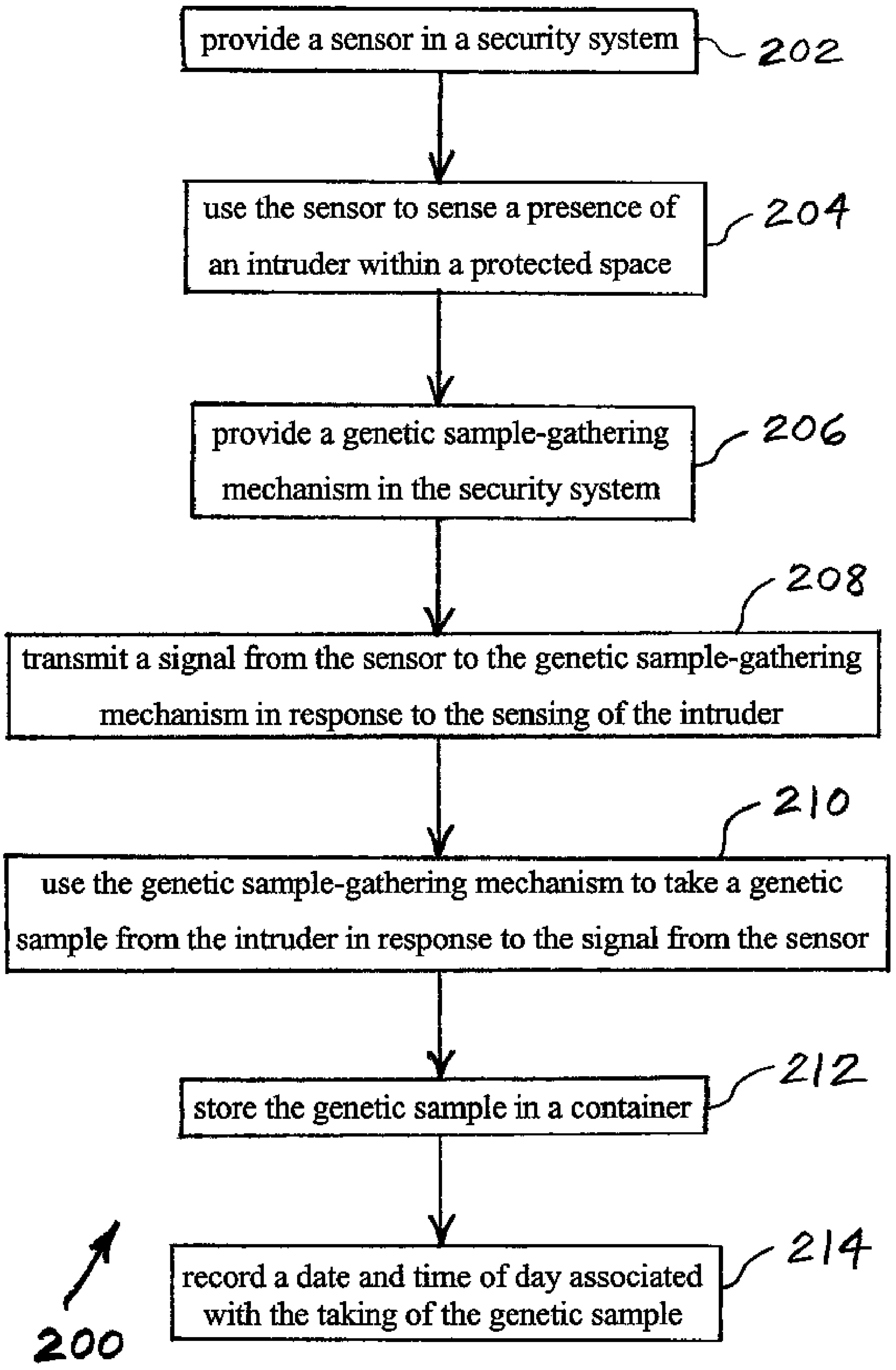
FIG. 2 is a flow chart illustrating one embodiment of a method of the present invention for operating a security system.

Illustrated in FIG. 2 is one embodiment of a method 200 of the present invention for operating a security system. In a first step 202, a sensor is provided in the security system. For example, as shown in FIG. 1, a sensor 22, which may be in the form of any conventional building security sensor, is provided in security system 10.

In a next step 204, the sensor is used to sense a presence of an intruder within a protected space. In FIG. 1, sensor 22 is used to sense the presence of intruder 16 within protected premises 12, such as a building, residence, or designated outdoor area.

Next, in step 206, a genetic sample-gathering mechanism is provided in the security system. That is, a genetic sample-gathering mechanism 28 is provided in security system 10, as illustrated in FIG. 1.

In step 208, a signal is transmitted from the sensor to the genetic sample-gathering mechanism in response to the sensing of the intruder. In the embodiment shown in FIG. 1, a signal is transmitted on line 24 from sensor 22 to genetic sample-gathering mechanism 28 in response to the sensing of intruder 16 by sensor 22.

In a next step 210, the genetic sample-gathering mechanism is used to take a genetic sample from the intruder in response to the signal from the sensor. For example, genetic sample-gathering mechanism 28 may be used to take a DNA sample from intruder 16 in response to mechanism 28 receiving an alarm signal from sensor 22.

Next, in step 212, the genetic sample is stored in a container. That is, the DNA sample collected by genetic sample-gathering mechanism 28 may be stored in a container 30 that securely retains and preserves the sample for later analysis in order to determine the identity of intruder 16.

In a final step 214, a date and time of day associated with the taking of the genetic sample is recorded. In the embodiment shown in FIG. 1, a date and time of day is continuously provided by clock 36 to time stamp module 32. When time stamp module 32 receives signal 34 from container 30, module 32 associates the most currently received date and time of day with the DNA sample taken from intruder 16 and stored in container 30. Module 32 may then record in memory that date and time of day in association with the DNA sample taken from intruder 16.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A security system comprising:

a sensor configured to sense a presence of an intruder within a protected space; and a genetic sample-gathering mechanism configured to take a genetic sample from the intruder in response to a signal from the sensor.

2. The system of claim 1 wherein the protected space has a plurality of points of ingress at which the intruder may enter the protected space, the system including a plurality of genetic sample-gathering mechanisms, each of the mechanisms being associated with a corresponding one of the points of ingress.

3. The system of claim 1 wherein the protected space has a point of ingress at which the intruder may enter the protected space, the genetic sample-gathering mechanism being associated with the point of ingress.

4. The system of claim 1 wherein the genetic sample-gathering mechanism comprises at least one of a vacuum pump, a turnstile and a static charge attraction device.

5. The system of claim 1 wherein the genetic sample-gathering mechanism includes a container, the genetic sample-gathering mechanism being configured to store the sample in the container.

6. The system of claim 1 wherein the genetic sample-gathering mechanism is configured to timestamp the sample.

7. The system of claim 1 wherein the signal comprises an alarm signal, the system being configured to transmit the alarm signal to a central office.

8. The system of claim 1 further comprising a visual distraction device configured to provide a visual distraction substantially simultaneously with the taking of the genetic sample.

9. A method of operating a security system, comprising the steps of:

providing a sensor in the security system;

using the sensor to sense a presence of an intruder within a protected space;

providing a genetic sample-gathering mechanism in the security system;

transmitting a signal from the sensor to the genetic sample-gathering mechanism in response to the sensing of the intruder; and using the genetic sample-gathering mechanism to take a genetic sample from the intruder in response to the signal from the sensor.

10. The method of claim 9 wherein the protected space has a plurality of points of ingress at which the intruder may enter the protected space, the system including a plurality of genetic sample-gathering mechanisms, each of the mechanisms being associated with a corresponding one of the points of ingress.

11. The method of claim 9 wherein the protected space has a point of ingress at which the intruder may enter the protected space, the genetic sample-gathering mechanism being associated with the point of ingress.

12. The method of claim 9 wherein the genetic sample-gathering mechanism comprises at least one of a vacuum pump, a turnstile and a static charge attraction device.

13. The method of claim 9 wherein the genetic sample-gathering mechanism includes a container, the method comprising the further step of storing sample in the container.

14. The method of claim 9 comprising the further step of using the genetic sample-gathering mechanism to timestamp the sample.

15. The method of claim 9 wherein the signal comprises an alarm signal, the method comprising the further step of transmitting the alarm signal to a central office.

16. A method of operating a security system, comprising the steps of:

providing a sensor in the security system;

using the sensor to sense a presence of an intruder within a protected space;

providing a genetic sample-gathering mechanism in the security system;

transmitting a signal from the sensor to the genetic sample-gathering mechanism in response to the sensing of the intruder;

using the genetic sample-gathering mechanism to take a genetic sample from the intruder in response to the signal from the sensor;

storing the genetic sample in a container; and recording a date and time of day associated with the taking of the genetic sample.

17. The method of claim 16 wherein the protected space has a plurality of points of ingress at which the intruder may enter the protected space, the system including a plurality of genetic sample-gathering mechanisms, each of the mechanisms being associated with a corresponding one of the points of ingress.

18. The method of claim 16 wherein the protected space has a point of ingress at which the intruder may enter the protected space, the genetic sample-gathering mechanism being associated with the point of ingress.

19. The method of claim 16 wherein the genetic sample-gathering mechanism comprises at least one of a vacuum pump, a turnstile and a static charge attraction device.

20. The method of claim 16 wherein the signal comprises an alarm signal, the method comprising the further step of transmitting the alarm signal to a central office.

* * * * *